(12) United States Patent
Sugiyama et al.

(10) Patent No.: US 7,210,554 B2
(45) Date of Patent: May 1, 2007

(54) POWER STEERING SYSTEM

(75) Inventors: Yoshitaka Sugiyama, Kanagawa (JP); Yuji Torizawa, Kanagawa (JP)

(73) Assignee: Hitachi Ltd., Tokyo-to (JP)

( * ) Notice: Subject to any disclaimer, the term of this patent is extended or adjusted under 35 U.S.C. 154(b) by 286 days.

(21) Appl. No.: 10/941,110

(22) Filed: Sep. 15, 2004

(65) Prior Publication Data
US 2005/0056480 A1 Mar. 17, 2005

(30) Foreign Application Priority Data
Sep. 16, 2003 (JP) .............................. 2003-322495

(51) Int. Cl.
*B62D 5/06* (2006.01)
(52) U.S. Cl. ...................... 180/421; 180/417; 180/422; 180/441; 701/42; 701/43
(58) Field of Classification Search ................ 180/417, 180/421, 422, 441; 701/41
See application file for complete search history.

(56) References Cited

U.S. PATENT DOCUMENTS

| | | | | |
|---|---|---|---|---|
| 5,279,380 A | * | 1/1994 | Frank et al. ................. | 180/422 |
| 5,747,955 A | * | 5/1998 | Rotunda et al. ............. | 318/434 |
| 6,052,633 A | * | 4/2000 | Fukuyama et al. ........... | 701/41 |
| 6,279,675 B1 | * | 8/2001 | Bohner et al. .............. | 180/403 |
| 6,795,762 B2 | * | 9/2004 | Itoh et al. ..................... | 701/43 |

FOREIGN PATENT DOCUMENTS

JP 2002-145087 A 5/2002

* cited by examiner

*Primary Examiner*—Lesley D. Morris
*Assistant Examiner*—Marc A. Scharich
(74) *Attorney, Agent, or Firm*—Sughrue Mion, PLLC

(57) ABSTRACT

A power steering system includes a hydraulic power cylinder, a hydraulic pump for supplying an oil pressure to the hydraulic power cylinder, an electric motor for driving the hydraulic pump, a first detector for detecting a steering assist force to be applied to a steering wheel, a second detector for detecting an operating condition of the electric motor, and a controller. The controller includes a control section for controlling the electric motor based on the required steering assist force detected by the first detector so as to cause the hydraulic pump to produce a required oil pressure, and a determining section for determining based on the operating condition of the electric motor and the required steering assist force detected by the first detector whether or not the power steering system is abnormal.

20 Claims, 7 Drawing Sheets

POWER STEERING SYSTEM

BACKGROUND OF THE INVENTION

The present invention relates to a power steering system for generating a steering assist force by means of a hydraulic power cylinder that is operated in accordance with a steering torque of a steering wheel or the like.

This kind of power steering system is disclosed in Unexamined Japanese Patent Publication No. 2002-145087 which is assigned to the same assignee of this application.

The power steering system includes a steering shaft attached to a steering wheel, an output shaft connected to a lower end portion of the steering shaft, a rack and pinion mechanism provided to a lower end portion of the output shaft, a hydraulic power cylinder connected to the rack, a reversible pump for selectively supplying working oil to one of axially opposite first and second oil pressure chambers of the hydraulic power cylinder by way of corresponding one of first and second communication passages, and an electromagnetic valve for selectively opening and closing a bypass passage connecting between the first and second communication passages.

When the steering wheel is steered to the left or right during running of the vehicle, a detecting mechanism detects a steering torque for such a steering operation and supplies a signal by way of a control circuit to the electromagnetic valve to close the same while causing the reversible pump to rotate in the forward direction or in the reverse direction thereby supplying working oil in one of the oil pressure chambers and one of the communication passages to the other of the oil pressure chambers and the other of the communication passages.

Further, the power steering system is provided with an abnormal condition monitoring circuit for monitoring an abnormal condition of an electric motor for driving the reversible pump. The abnormal condition monitoring circuit is configured to determine that the electric motor is abnormal when the rotation speed of the electric motor is zero and causes the electromagnetic valve to open thereby performing a failsafe function. The abnormal condition monitoring circuit can also detect that the reversible pump is abnormal, because the reversible pump is connected to the electric motor.

SUMMARY OF THE INVENTION

In the meantime, in the above-described power steering system, the abnormal condition monitoring circuit is configured to determine that the electric motor is abnormal or in failure only when the motor speed of the electric motor is zero. Thus, when the electric motor rotates a little though it cannot generate a necessary driving torque, the abnormal condition monitoring circuit judges that the electric motor is normal. Accordingly, the abnormal condition monitoring circuit cannot make an accurate judgment on an abnormal condition (malfunctioning condition) of the electric motor.

It is accordingly an object of the present invention to provide a power steering system that is provided with a controller capable of detecting an abnormal condition of the power steering system assuredly.

To achieve the above object, there is provided according to an aspect of the present invention a power steering system comprising a hydraulic power cylinder for generating a steering assist force for assisting a steering operation of a steering mechanism connected to a steering wheel and having first and second oil pressure chambers to which first and second passages are connected, respectively, a reversible pump having first and second outlet ports for supplying oil pressure to one of the first and second oil pressure chambers through corresponding one of the first and second outlet ports and corresponding one of the first and second passages, an electric motor for driving the reversible pump in a forward direction and in a reverse direction, a steering assist force detector for detecting a steering assist force required to be applied to the steering mechanism, an electric motor control circuit for supplying to the electric motor a drive signal for causing the reversible pump to produce a required oil pressure in accordance with the required steering assist force detected by the steering assist force detector, a driving state detector for detecting a driving state of the electric motor, and an abnormal condition monitoring circuit for making a comparison between the driving state of the electric motor and the required steering assist force detected by the steering assist force detector and determining based on a result of the comparison whether or not the power steering system is abnormal. By this, the abnormal condition monitoring circuit checks not only the rotation speed of the electric motor but the required or necessary steering assist force detected by the steering assist force detector so as to determine that the power steering system is abnormal when the electric motor becomes incapable of producing a required drive force that enables the hydraulic power cylinder to produce the required steering assist force even if the electric motor is still rotating or operating. Thus, it becomes possible to make the more accurate judgment on the abnormal condition of the power steering system.

According to another aspect of the present invention, the steering assist force detector comprises a torque sensor for detecting a steering torque produced between the steering wheel and the steering mechanism. By monitoring the steering torque, an abnormal condition of the power steering system can be detected accurately since the steering torque is best representative of an operating condition of the power steering system except for a particular case where the steering wheel is immovable due to abutment of stoppers.

According to a further aspect of the present invention, the driving state detector is configured to detect a rotation speed of the electric motor. Monitoring of the rotation speed of the electric motor includes monitoring of whether the electric motor is rotating or stops rotating and whether the rotation speed is high or low, thus making it possible to monitor the operating condition of the power steering system more in detail.

According to a further aspect of the present invention, the driving state detector is configured to estimate the rotation speed of the electric motor based on a current value and a voltage value of electricity supplied to the electric motor. By this, the rotation sensor for the electric motor can be dispensed with, thus making it possible to decrease the cost.

According to a further aspect of the present invention, the steering assist force detector comprises a torque sensor for detecting a steering torque produced between the steering wheel and the steering mechanism, the driving state detector is configured to detect a rotation speed of the electric motor, and the abnormal condition monitoring circuit is configured to determine that the power steering system is abnormal when the steering torque produced between the steering wheel and the steering mechanism is equal to or larger than a predetermined value and the rotation speed of the electric motor is equal to or smaller than a predetermined value. By this, it is determined that the electric motor or the reversible pump is for example in failure or trouble and locked up when the rotation speed of the electric motor is lower than a predetermined value though the required steering torque is larger than a predetermined value. Accordingly, the diagnosis of malfunction or failure of the electric motor can be made accurately.

According to a further aspect of the present invention, the electric motor control circuit is configured to stop supply of electricity to the electric motor when the abnormal condition monitoring circuit determines that the power steering system is abnormal. In case the steering torque is larger than a predetermined value and the rotation speed of the electric motor is smaller than a predetermined value, it is highly possible that the electric motor is locked up. Thus, if supply of electricity to the electric motor is continued, the electric motor is possibly damaged. Accordingly, by stopping supply of electricity to the electric motor, it becomes possible to prevent the electric motor from being damaged.

According to a further aspect of the present invention, the driving state detecting circuit is configured to detect a rotation speed of the electric motor, and the abnormal condition monitoring circuit is configured to determine that the power steering system is abnormal when the steering torque produced between the steering wheel and the steering mechanism is equal to or larger than a predetermined value and the rotation speed of the electric motor is equal to or larger than a predetermined value. When the steering wheel is rotated, there can occur such a case in which an excessively large steering torque is required and the electric motor is driven to run at excessively high speed. In such a case, the oil pressure within the hydraulic power cylinder cannot be elevated so that the hydraulic power cylinder cannot generate a steering assist force. This is due to an insufficient amount of working oil within the hydraulic power cylinder due to leakage of the working oil. This aspect of the invention makes it possible to attain accurate diagnosis of such an abnormal condition.

According to a further aspect of the present invention, the electric motor control circuit is configured to stop supply of electricity to the electric motor when the abnormal condition detecting circuit determines that the power steering system is abnormal. When the steering torque is equal to or larger than a predetermined value and the rotation speed of the electric motor is equal to or larger than a predetermined value, there is highly possible that the electric motor is racing. Thus, if supply of electricity to the electric motor is continued, the electric motor or the reversible pump is possibly damaged. Accordingly, by stopping supply of electricity to the electric motor, it becomes possible to prevent the electric motor or the reversible pump from being damaged.

According to a further aspect of the present invention, the power steering system further comprising a communication passage for providing communication between the first and second passages and a valve disposed in the communication passage, wherein when the abnormal condition monitoring circuit determines that the power steering system is abnormal, the valve is opened to provide communication between the first and second passages. By this, in case of malfunction or failure of the power steering system, the communication passage is opened by the valve thereby providing communication between the first and second passages such that a manual steering operation can be attained.

According to a further aspect of the present invention, the abnormal condition monitoring circuit is configured to determine that the power steering system is normal when the steering assist force is smaller than a predetermined value. The steering assist force smaller than a predetermined value indicates that a normal steering assistance is given to a steering operation, thus making it possible to determine that the power steering system is normal.

DESCRIPTION OF THE PREFERRED EMBODIMENTS

Figure 1:
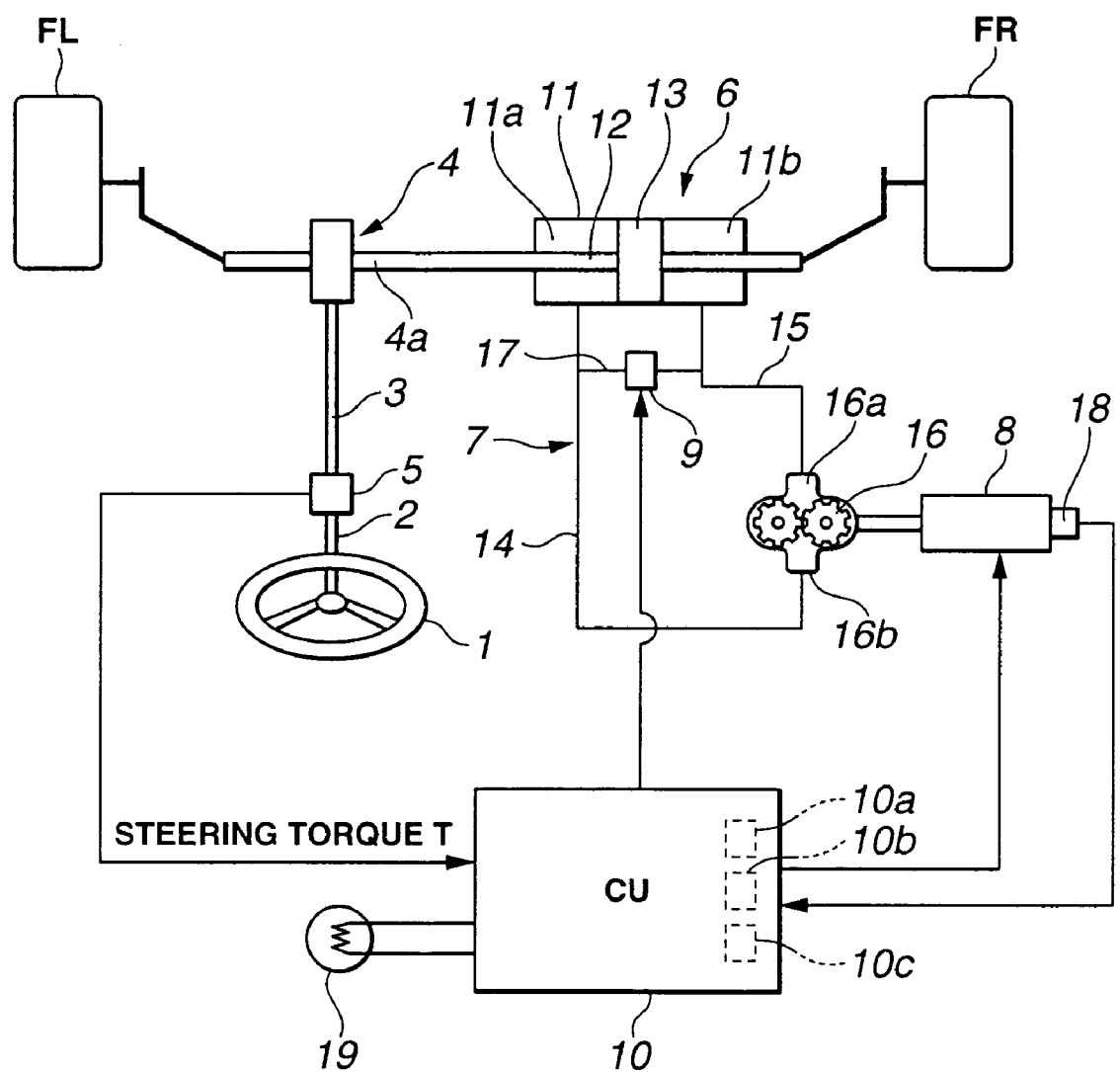
FIG. 1 is a schematic view of a power steering system according to an embodiment of the present invention.

Referring first to FIG. 1, a power steering system is shown schematically and includes steering wheel 1 connected to steering shaft 2, rack and pinion mechanism 4 provided to output shaft 3 that is disposed at a lower end portion of steering shaft 2, which rack and pinion mechanism 4 is a steering mechanism for applying a steering torque to left and right steerable road wheels FL, FR, torque sensor 5 disposed at a lower end side of steering shaft 2 and serving as a steering assist force detector for detecting a steering assist force through detection of a steering torque of steering wheel 1 (or more specifically, a steering torque produced between steering mechanism 4 and steering wheel 1), hydraulic power cylinder 6 connected to rack portion 4a of rack and pinion mechanism 4, hydraulic circuit 7 for supplying an oil pressure to hydraulic power cylinder 6, electric motor 8 for driving gear pump 16 which is included by hydraulic circuit 7 and will be described later, and control unit 10 for controlling electromagnetic valve 9 which is a valve and will be described later.

Hydraulic power cylinder 6 includes tubular cylinder portion 11 which is disposed so as to extend in the widthwise direction and through which is extended piston rod 12 connected to rack 4a and piston 13 fixed to piston rod 12 so as to be slidable within tubular cylinder portion 11. Further, defined within tubular cylinder portion 11 by means of piston 13 are first oil pressure chamber 11a and second oil pressure chamber 11b.

Hydraulic circuit 7 includes first and second passages 14, 15 connected at one end thereof to first and second oil pressure chambers 11a, 11b, respectively, gear pump 16 that is a reversible pump rotatable in a forward direction and in a reverse direction and connected to other ends of first and second passages 14, 15, communication passage 17 connecting between first and second passages 14, 15 and above-described electromagnetic valve 9 disposed in communication passage 17.

Electric motor 8 is driven in a forward direction or in a reverse direction by control current supplied thereto from control unit 10 thereby performing a drive control of gear pump 16. By the drive control of gear pump 16, the oil pressure to be supplied to oil pressure chambers 11a, 11b of hydraulic power cylinder 6 is controlled thereby performing a steering assist control in accordance with a steering force and a steering direction of steering wheel 1.

Gear pump 16 has a pair of outlet ports 16a, 16b from which is discharged pressurized oil that is generated at the time of rotation in the forward direction and in the reverse direction. Outlet ports 16a, 16b are connected to oil pressure chambers 11a, 11b of hydraulic power cylinder 6 by way of first and second passages 14, 15, respectively. On the other hand, though not shown, to an inlet port of gear pump 16 is connected a reservoir by way of an inlet side passage.

Further, communication passage 17 is disposed between first and second passages 14, 15 and in parallel with gear pump 16. On the other hand, electromagnetic valve 9 is a normally open type and is controlled so as to close when energized by (i.e., in response to an ON signal from) abnormal condition monitoring circuit 10a and an electromagnetic valve drive circuit (not shown) of control unit 10 and open when unenergized (i.e., in response to an OFF signal). In the meantime, to electromagnetic valve 9 is fluidly connected a reservoir for supplying working oil to oil pressure circuit 7. Further, abnormal condition indicating lamp 19 is provided to a vehicle instrument panel or the like.

To control unit 10 is inputted a rotation speed signal from rotation speed sensor (hole sensor) 18 serving as a driving state detector for detecting a current rotation speed of electric motor 8 and is also inputted a torque signal outputted from torque sensor 5. In the meantime, electric motor 8 is provided with three rotation speed sensors 18 that are disposed circumferentially of electric motor 8.

Further, control unit 10 includes a torque sensor signal processing circuit (not shown) for processing a torque signal, electric motor control circuit 10b consisting of an electric motor control computing circuit and an electric motor drive circuit for controlling electric motor 8 based on a signal from rotation sensor 18 or the like, abnormal condition monitoring circuit 10c for detecting an abnormal condition of the power steering system due to malfunction or failure of electric motor 8, hydraulic power cylinder 6, or the like and the above described electromagnetic valve drive circuit (not shown) for controlling opening and closing of electromagnetic valve 9.

Figure 2:
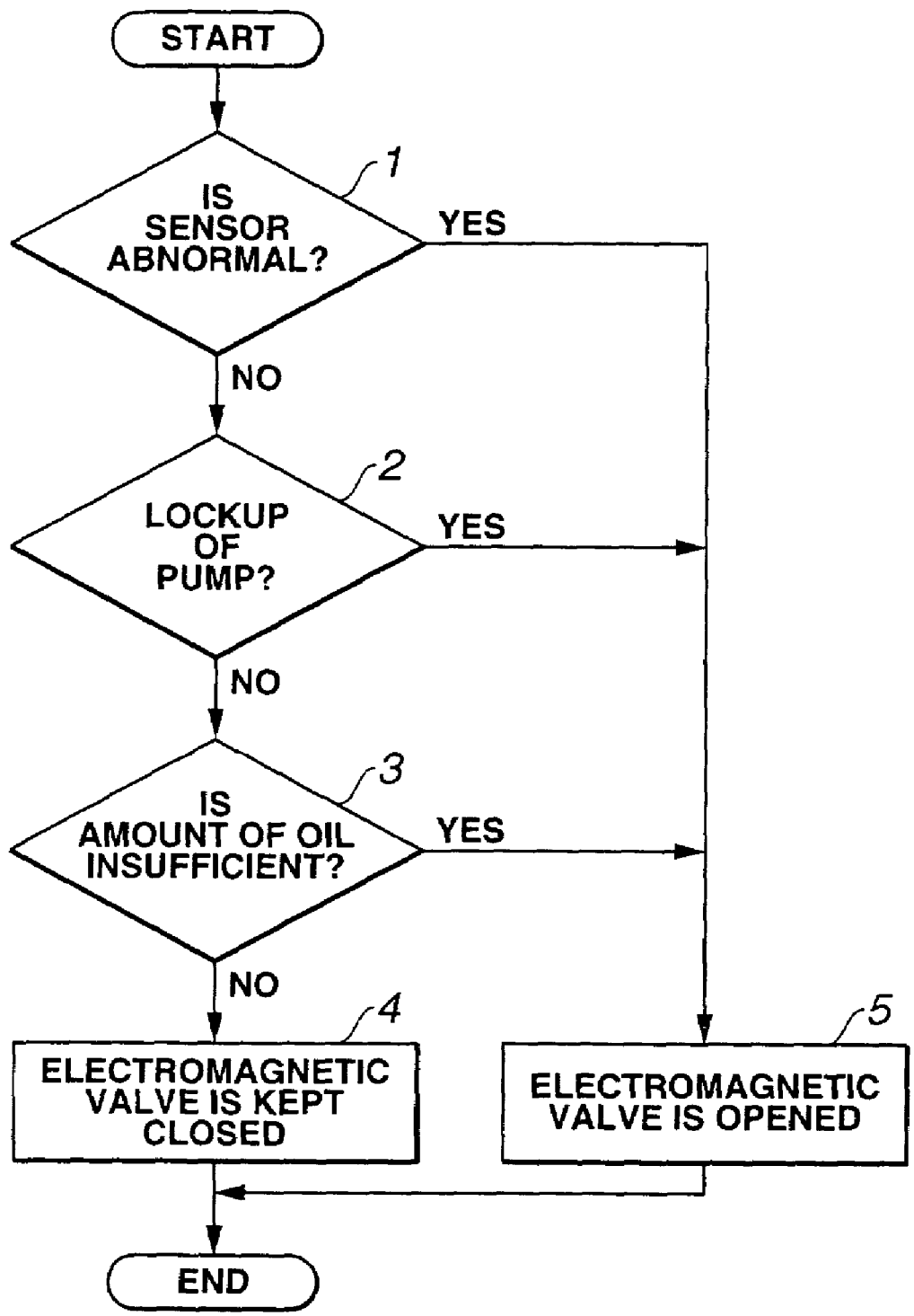
FIG. 2 is a flow chart showing a control for detecting and processing a failure in each constituent portion, which is executed in a control unit according to the embodiment of the present invention.

Referring to the flow chart of FIG. 2, a control processing by means of abnormal condition monitoring circuit 10c of control unit 10 will be described briefly.

First, in step S1, it is determined whether or not rotation sensor 18 is abnormal. If it is determined that rotation sensor 18 is not abnormal, the control goes to step 2.

In step S2, it is determined whether or not electric motor 8 or reversible pump 16 is in failure and locked up. If it is determined that reversible type pump 16 is not in failure and not locked up, the control goes to step 3.

In step 3, it is determined whether or not the amount of working oil within hydraulic circuit 7 for hydraulic power cylinder 6 is insufficient. If it is determined that the amount of working oil is not insufficient, the control goes to step S4.

In step S4, since there is not any abnormality in electric motor 8 and hydraulic circuit 7, energization of electromagnetic valve 9 by means of the electromagnetic valve drive circuit is continued thereby holding electromagnetic valve 9 in a closed state.

If it is determined in step S1 that rotation sensor 18 is abnormal, if it is determined in step 2 that electric motor 8 or reversible pump 16 is abnormal or if it is determined in step S3 that the oil pressure in oil pressure chambers 11a, 11b is lowered due to leakage of oil within hydraulic circuit 7 or the like, the control goes to step S5.

In step S5, electromagnetic valve 9 is unenergized by the electromagnetic valve drive circuit (i.e., an OFF signal outputted from the electromagnetic valve drive circuit) and is thereby opened. By this, first and second passages 14, 15 are communicated by way of communication passage 17, so that supply and discharge of oil to and from oil pressure chambers 11a, 11b is not performed but oil pressure chambers 11a, 11b are held communicated with each other.

For this reason, a steering assist force is not applied to a steering operation of steering wheel 1 but a steering force is transmitted from steering shaft 2 to output shaft 3 and then to rack and pinion mechanism 4 such that a manual steering operation condition is attained.

Then, referring to the flow chart of FIG. 3 and the output pattern of each hole sensor of FIG. 4, a concrete processing for determination and detection of abnormality of rotation sensor (hole sensor) 18 in step 1 of FIG. 2, which is executed in control unit 10, will be described.

Figure 3:
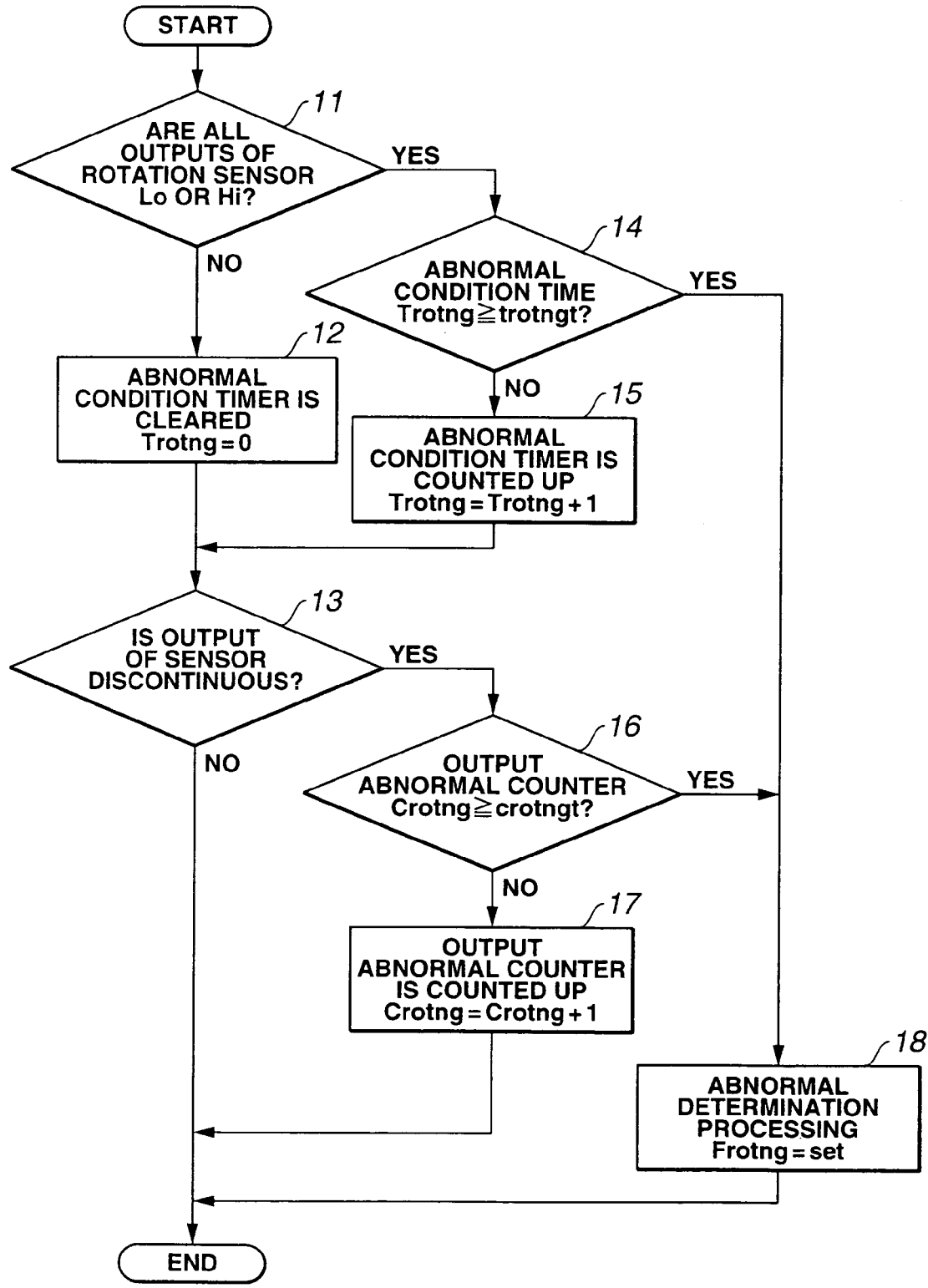
FIG. 3 is a flow chart showing a abnormal condition monitoring control for monitoring an abnormal condition of a rotation sensor by means of an abnormal monitoring circuit, which is executed in the control unit according to the embodiment of the present invention.

Namely, in step S11 in FIG. 3, it is determined whether or not the outputs of rotation sensors 18 (hole sensors 1 to 3) are all Lo (low) or Hi (high). If the outputs are not all Lo or Hi, a processing for clearing an abnormal condition timer is performed in step S12. Thereafter, in step S13, it is determined whether or not the output of rotation sensor 18 is discontinuous. If it is determined that the output of rotation sensor 18 is discontinuous, the control processing is ended.

If it is determined in step S11 that the outputs of rotation sensors 18 are all Lo or Hi, the processing goes to step S14 where it is determined whether or not an abnormal condition time Trotng is equal to or larger than a predetermined time trotngt. If it is determined that the abnormal condition time is smaller than the predetermined time, the processing goes to step S15 where the count of the abnormal condition timer is increased by one and thereafter goes to step S13.

Further, if it is determined in step S13 that the output of rotation sensor 18 is discontinuous, the processing goes to step S16 where it is determined whether or not an output abnormal count value Crotng is equal to or larger than a predetermined value crotng. If it is determined that the output abnormal counter value is smaller than the predetermined value, the processing goes to step S17.

In step S17, the output abnormal count value is increased by one and the processing thereafter is ended.

Further, if it is determined in step S14 that the abnormal condition time is equal to or larger than the predetermined time or it is determined in step S16 that the output abnormal count value is equal to or larger than the predetermined count value, the processing goes to step S18.

In step s18, an abnormal judgment process (Frotng=set) is performed and then the processing is ended.

Figure 4:
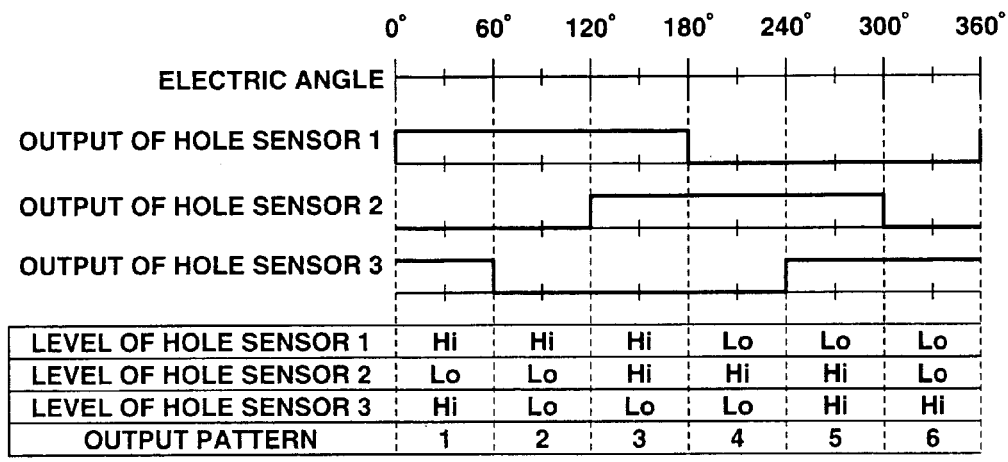
FIG. 4 is an output characteristic view for checking an abnormal condition of the rotation sensor.

FIG. 4 shows the output levels (Lo, Hi) of rotation sensors 18 (hole sensors 1 to 3) in relation to an electric angle (0° to 360°) corresponding to the flow chart of FIG. 3. The output pattern is in the order of 1-2-3-4-5-6-1-2 - - - when steering wheel 1 is rotated rightward and 6-5-4-3-2-1-6-5 - - - when steering wheel 1 is rotated leftward. The sensor abnormal judgment process shown in the flow chart of FIG. 3 is configured to monitor this order.

Then, with reference to the flow chart of FIG. 5 and the time chart of FIG. 6, a concrete control for monitoring a failure and lockup condition of reversible pump 16 shown in step S2 of FIG. 2 will be described.

Figure 5:
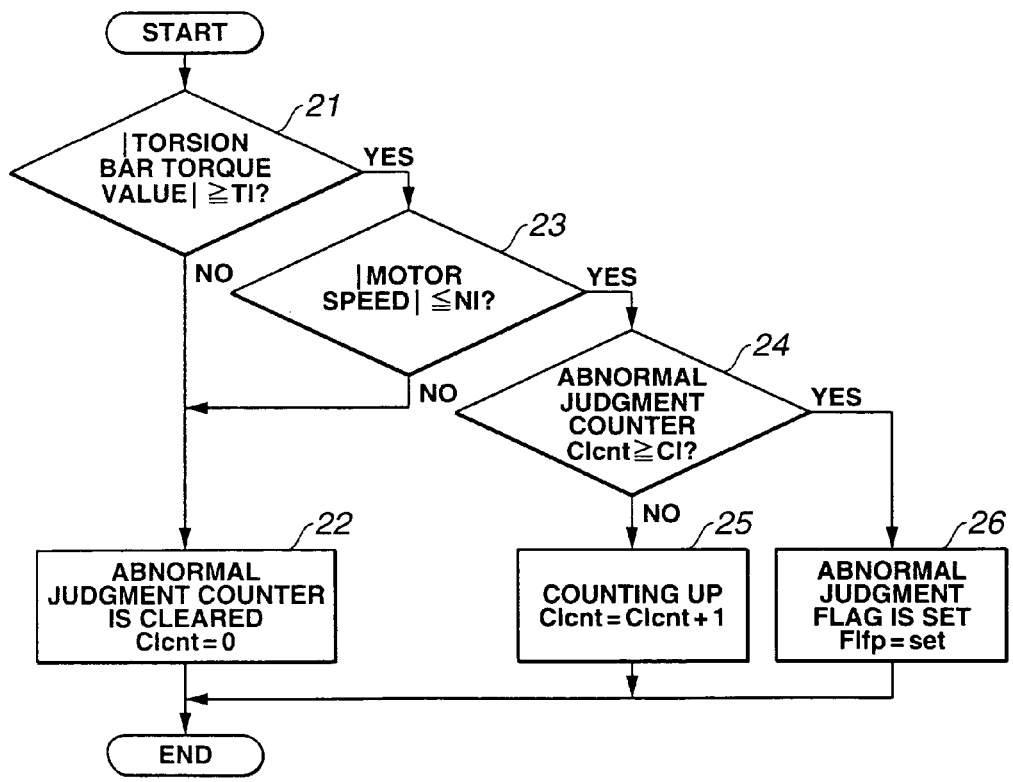
FIG. 5 is a flow chart showing a control that is executed in the control unit according to the embodiment of the present invention.
Figure 6:
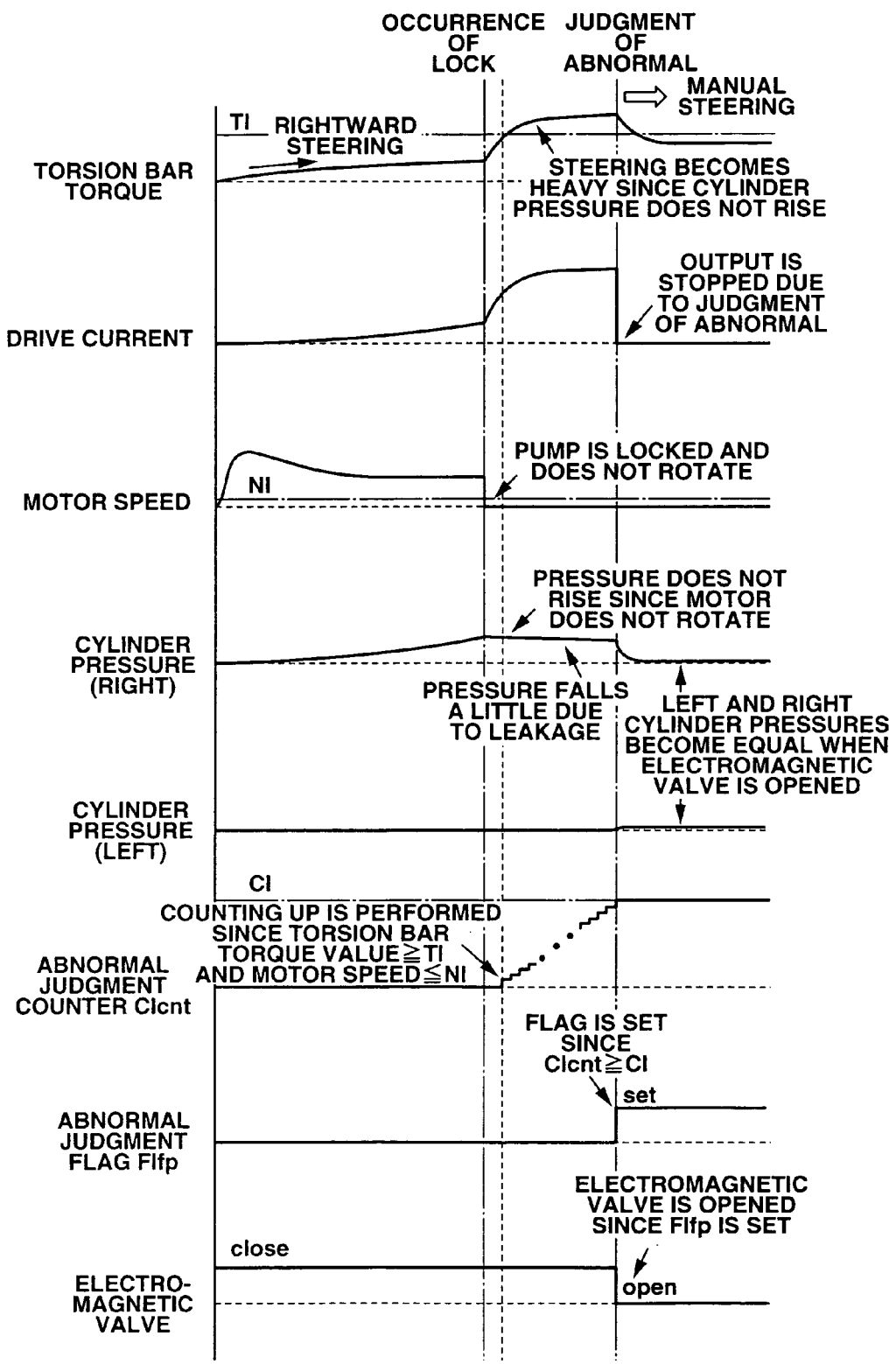
FIG. 6 is a time chart corresponding to the flow chart of FIG. 5.

First, in case a vehicle driver turns steering wheel 1 rightward (i.e., clockwise), it is determined in step 21 of FIG. 5 whether or not a torsional torque value (absolute value) caused by twisting a torsion bar of torque sensor 5 is larger than a predetermined torque value TI. If it is determined that the torsional torque value is smaller than the predetermined value, it is determined that there is not any abnormality and processing goes to step S22.

In step S22, the abnormal judgment counter is cleared.

If it is determined in step 21 that the torsional torque value is equal to or larger than the predetermined torque value TI, processing goes to step 23, namely, the torsion bar torque becomes larger than the predetermined torque value TI since the cylinder pressure is not increased so that a larger steering force is required.

In step S23, it is determined whether or not a rotation speed value (absolute value) per second of electric motor 8 is smaller than a predetermined rotation speed value NI. If determined larger, the control goes to step S22 to perform a similar processing as described above. If determined smaller, i.e., if electric motor 8 stops rotating or in a condition just before stopping so that the rotation speed value is quite small, the processing goes to step s24.

In step S24, an abnormal continuation time during which electric motor 8 continues rotating at a small rotation speed (abnormal judgment time) is counted by a timer and it is determined whether or not a count value is larger than a predetermined time CI. If it is determined that the continuation time is smaller than the predetermined time CI, it is determined that there is not any abnormality and the process goes to step s25.

In step S25, a count up process for adding one to the count value is performed and the routine is ended.

If it is determined in step S24 that the abnormal continuation time is larger than the predetermined time, the process goes to step S26. In step S26, based on judgment that electric motor 8, etc. are abnormal, i.e., electric motor 8 is in failure and stopped to cause pump to lock up as shown in FIG. 5, an abnormal judgment flag FIfp is set and the routine is ended.

Accordingly, in response to the abnormal judgment flag, control unit 10 outputs an unenergization signal (OFF signal) to electromagnetic valve 9 by way of the electromagnetic valve drive circuit thereby causes electromagnetic valve 9 to open, while stopping supply of drive current (electricity) to electric motor 8.

By this, the oil pressure generated in second oil pressure chamber 11b on the right-hand side does not become higher but released by the opening of electromagnetic valve 9, thus causing oil pressure chambers 11a, 11b to become equal in oil pressure.

Accordingly, it becomes possible not only to stop generation of a steering assist force by means of hydraulic power cylinder 6 but to prevent useless consumption of electric power, while making it possible to attain a manual steering of steering wheel 1. Further, when the steering torque is equal to or larger than a predetermined value and the rotation speed of the electric motor is equal to or smaller than a predetermined value, there is highly possible that the electric motor is locked up. Thus, if supply of current to the electric motor is continued, the electric motor is possibly damaged. Accordingly, by stopping supply of current to the electric motor, it becomes possible to prevent the electric motor from being damaged.

From the foregoing, according to the present invention, since abnormal monitoring circuit 10c checks not only the rotation speed of electric motor 8 but the necessary or required steering assist force (torque value) detected by torque sensor 5 so as to determine that the power steering system is in failure when electric motor 8 becomes incapable of producing a required drive force that enables hydraulic power cylinder 6 to produce the required steering assist force even if electric motor 8 is still rotating or operating, it becomes possible to make the more accurate judgment on the abnormal condition of the power steering system.

Particularly, since it is determined according to this embodiment that electric motor 8 is in failure and locked up in case the rotation speed of electric motor 8 is equal to or smaller than a predetermined rotation speed NI though the required steering torque detected by torque sensor 5 is larger than a predetermined value, an accurate diagnosis of failure of electric motor 8 can be attained.

Figure 7:
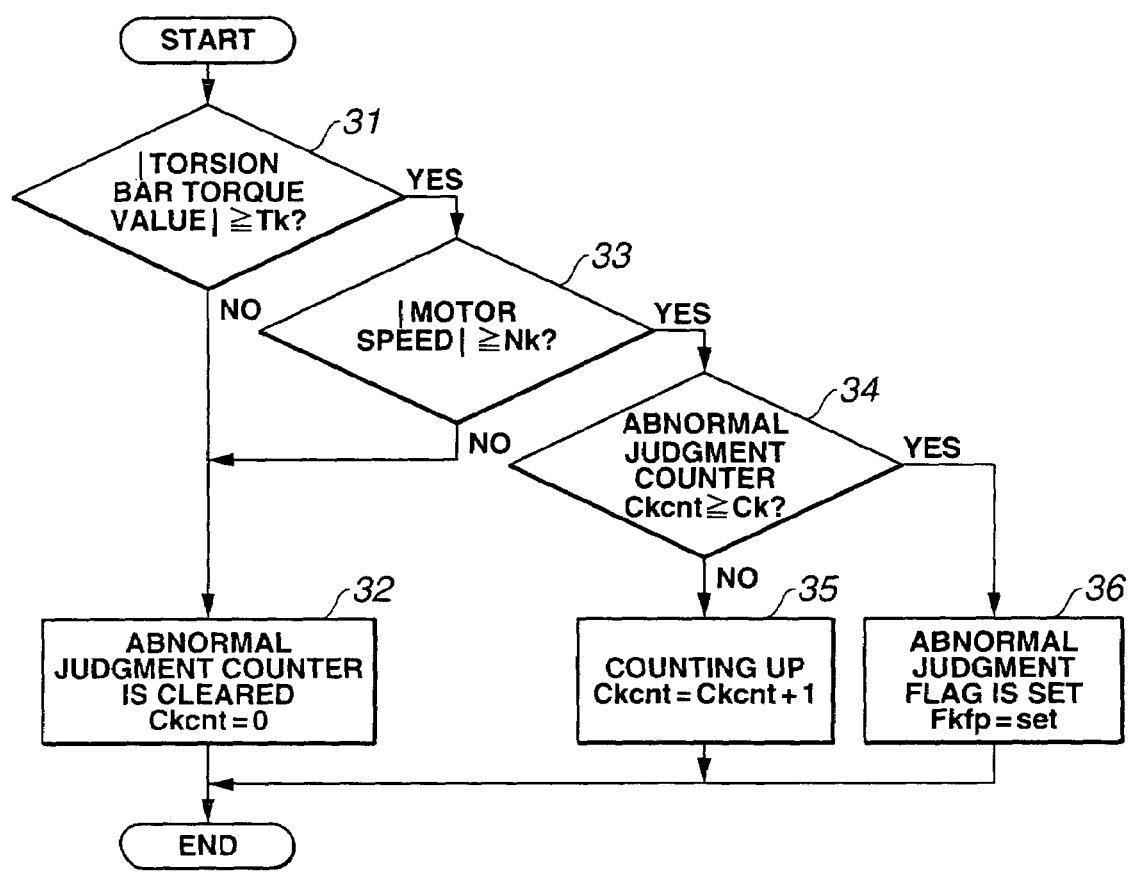
FIG. 7 is a flow chart of a control executed in the control unit according to another embodiment of the present invention.
Figure 8:
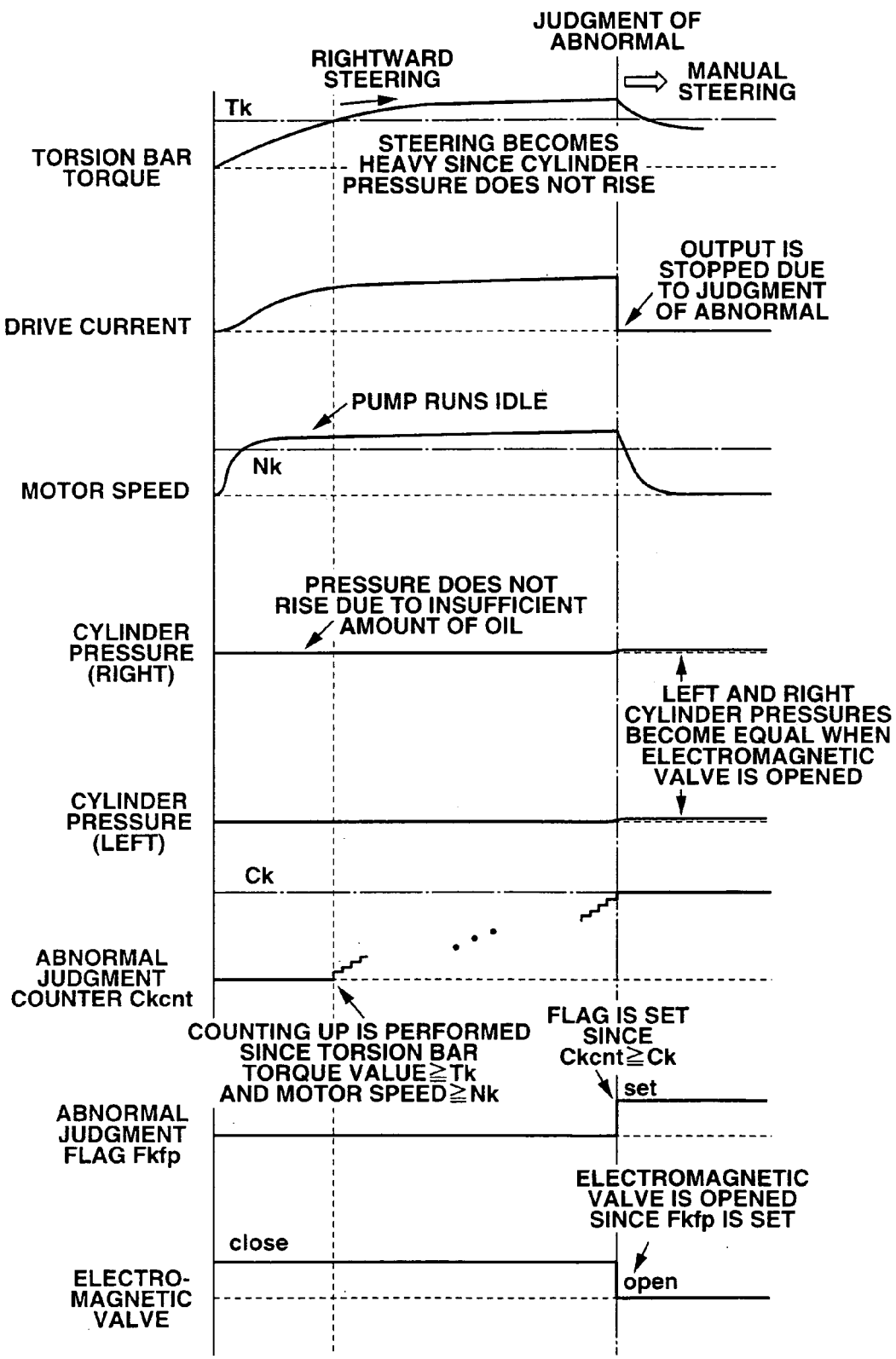
FIG. 8 is a time chart corresponding to the flow chart of FIG. 7.

FIGS. 7 and 8 show a second embodiment which differs from the first embodiment in a control for monitoring a failure and lockup condition of reversible pump 16 that is executed in abnormal condition monitoring circuit 10c of control unit 10.

First, it is determined in step S31 of FIG. 7 whether or not, in case a vehicle driver turns steering wheel 1, for example, rightward (i.e., clockwise) a torsional torque value (absolute value) of a torsion bar is larger than a predetermined torque value Tk. If determined smaller, it is determined that there is not any abnormality and the process goes to step S32.

In step S32, a clearing process for clearing an abnormal judgment counter (Ckcnt=0) is performed.

In step S31, if it is determined in step 31 that the torsional torque value is equal to or larger than the predetermined torque value Tk, that is, if it is determined that the torsion bar torque value is equal to or larger than the predetermined value Tk since the cylinder pressure is not increased to increase the steering force, the process goes to step S33.

In step S33, it is determined whether or not a rotation speed value (absolute value) per second of electric motor 8 is smaller than a predetermined rotation speed value Nk. If determined smaller, the process goes to step S32 to perform a similar processing as described above. If determined larger, i.e., if it is determined that electric motor 8 is in an overrunning (racing) condition, i.e., in a condition of rotating at a speed larger than Nk as shown in FIG. 8, the processing goes to step S34.

In step S34, an abnormal continuation time during which electric motor 8 continues rotating at a high rotation speed (abnormal judgment time) is counted by a timer and it is determined whether or not a count value is larger than a predetermined time Ck. If it is determined that the continuation time is smaller than the predetermined time Ck, it is determined that there is not any abnormality and the process goes to step S35.

In step S35, a count up process for adding one to the count Ckcnt is performed and the routine is ended.

If it is determined in step S34 that the abnormal continuation time is longer than a predetermined time, the process goes to step S36. In this connection, the process goes to step 36 in case the amount of working oil within first and second oil pressure chambers 11a, 11b is insufficient so that the oil pressure within first and second oil pressure chambers 11a, 11b does not rise, namely, as shown in FIG. 8, the oil pressure within first and second oil pressure chambers 11a, 11b is lowered due to leakage of working oil in hydraulic circuit 7 so that hydraulic power cylinder 6 cannot operate properly and is judged abnormal. Thus, in step S36, an abnormal judgment flag Fkfp is set and the control process is ended at once.

Accordingly, on the basis of the abnormal judgment flag, control unit 10 outputs a de-energization signal (OFF signal) to electromagnetic valve 9 by way of the electromagnetic drive circuit thereby stopping supply of electricity to electric motor 8.

By this, the oil pressure produced in second oil pressure chamber 11b on the right-hand side is released by the opening of electromagnetic valve 9, thus allowing the oil pressures in oil pressure chambers 11a, 11b to become equal with each other.

Accordingly, useless consumption of electricity can be prevented and a manual steering operation can be attained. Further, when the steering torque is equal to or larger than a predetermined value and the rotation speed of the electric motor is equal to or higher than a predetermined value, there is highly possible that the electric motor is racing. Thus, if supply of current to the electric motor is continued, the electric motor or the reversible pump is possibly damaged. Accordingly, by stopping supply of current to the electric motor, it becomes possible to prevent the electric motor or the reversible pump from being damaged.

In this manner, according to the present invention, it becomes possible to diagnosis a malfunction or abnormal state caused by an insufficient amount of working oil within oil pressure chambers 11a, 11b due to leakage of oil in hydraulic circuit 7 or the like assuredly.

Further, it becomes possible to estimate the rotation speed of electric motor 8 based on current value and voltage value of electricity supplied to electric motor 8.

Namely, the voltage applied to electric motor 8 can be determined from the following expression.

$$Vm \text{ (voltage applied to electric motor)} = V\omega \text{ (voltage equivalent to reverse electromotive force)} + Vtrq \text{ (voltage necessary for output of torque)}$$

where $V\omega = Ke$ (coefficient of reverse electromotive force) $\times \omega$ (angular velocity of electric motor), and $Vtrq = Im$ (motor instruction current) $\times Rc$ (circuit resistance).

The above expression can be rewritten as follows.

$$\omega = \{Vm - (Im \times Rc)\}/Ke$$

Since Rc and Ke in the above expression are determined by the specification of the power steering system and there can be treated as constants and further since Vm and Im are obtained from the measurement values of sensors, it becomes possible to estimate the rotation speed of electric motor 8 by the above expression.

The following technical concept can be grasped from the above-described embodiments except for the subject matters described in the following claims.

The entire contents of Japanese Patent Applications P2003-322495 (filed Sep. 16, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, in place of rotation sensor 18, a sensor for detecting the rotation speed of reversible type pump 16 or the pressure sensor of first and second oil pressure chambers 11a, 11b can be used according to the specification of the power steering system. Further, in place of gear pump 16, another type of pump can be used. Further, the valve 9 is not limited to an electromagnetic valve but another type of valve can be used. Further, hydraulic circuit 7 can be varied depending upon a variation in the specification of the vehicle. The scope of the invention is defined with reference to the following claims.

What is claimed is:

1. A power steering system comprising:
    a hydraulic power cylinder;
    a hydraulic pump for supplying an oil pressure to the hydraulic power cylinder;
    an electric motor for driving the hydraulic pump;
    a first detector for detecting a steering assist force that is required to be applied to a steering wheel;
    a second detector for detecting an operating condition of the electric motor; and
    a controller including:
    a control section for controlling the electric motor based on the steering assist force detected by the first detector so as to cause the hydraulic pump to produce a required oil pressure; and
    a determining section for determining based on the operating condition of the electric motor and the required steering assist force detected by the first detector whether or not the power steering system is abnormal.

2. A power steering system comprising:
    a hydraulic power cylinder for generating a steering assist force for assisting a steering operation of a steering mechanism and having first and second oil pressure chambers;
    a reversible pump for supplying an oil pressure to one of the first and second oil pressure chambers;
    an electric motor for driving the reversible pump;
    a steering assist force detector for detecting a steering assist force that is required to be applied to the steering mechanism;
    a driving state detector for detecting a driving state of the electric motor; and
    a controller including:
    an electric motor control section for controlling based on the required steering assist force detected by the steering assist force detector so as to cause the reversible pump to produce a required oil pressure in accordance with the required steering assist force; and
    an abnormal condition monitoring section for making a comparison between the driving state of the electric motor and the required steering assist force detected by the steering assist force detector and determining based on a result of the comparison whether or not the power steering system is abnormal.

3. A power steering system according to claim 2, wherein the steering assist force detector comprises a torque sensor for detecting a steering torque of a steering wheel connected to the steering mechanism.

4. A power steering system according to claim 2, wherein the driving state detector is configured to detect a rotation speed of the electric motor.

5. A power steering system according to claim 4, wherein the driving state detector is configured to estimate the rotation speed of the electric motor based on a current value and a voltage value of electricity supplied to the electric motor.

6. A power steering system according to claim 2, wherein the steering assist force detector comprises a torque sensor for detecting a steering torque of a steering wheel connected to the steering mechanism, the driving state detector is configured to detect a rotation speed of the electric motor, and the abnormal condition monitoring section is configured to determine that the power steering system is abnormal when the steering torque of the steering wheel is equal to or larger than a predetermined value and the rotation speed of the electric motor is equal to or smaller than a predetermined value.

7. A power steering system according to claim 6, wherein the electric motor control section is configured to stop supply of electricity to the electric motor when the abnormal condition monitoring section determines that the power steering system is abnormal.

8. A power steering system according to claim 2, wherein the steering assist force detector comprises a torque sensor for detecting a steering torque of a steering wheel connected to the steering mechanism, the driving state detector is configured to detect a rotation speed of the electric motor, and the abnormal condition monitoring section is configured to determine that the power steering system is abnormal when the steering torque of the steering wheel is equal to or larger than a predetermined value and the rotation speed of the electric motor is equal to or larger than a predetermined value.

9. A power steering system according to claim 7, wherein the electric motor control section is configured to stop supply of electricity to the electric motor when the abnormal condition monitoring section determines that the power steering system is abnormal.

10. A power steering system according to claim 2, further comprising first and second oil pressure passages fluidly connected to first and second outlet ports of the reversible pump, respectively, a communication passage for providing communication between the first and second oil pressure passages and a valve disposed in the communication passage, wherein when the abnormal condition monitoring section determines that the power steering system is abnormal, the valve is opened to provide communication between the first and second passages.

11. A power steering system comprising:
  a hydraulic power cylinder for generating a steering assist force for assisting a steering operation of a steering mechanism connected to a steering wheel and having first and second oil pressure chambers to which first and second passages are connected, respectively;
  a reversible pump having first and second outlet ports for supplying oil pressure to one of the first and second oil pressure chambers through corresponding one of the first and second outlet ports and corresponding one of the first and second passages;
  an electric motor for driving the reversible pump in a forward direction and in a reverse direction;
  a steering assist force detector for detecting a steering assist force that is required to be applied to the steering mechanism;
  an electric motor control circuit for supplying to the electric motor a drive signal for causing the reversible pump to produce a required oil pressure in accordance with the required steering assist force detected by the steering assist force detector;
  a driving state detector for detecting a driving state of the electric motor; and
  an abnormal condition monitoring circuit for making a comparison between the driving state of the electric motor and the steering assist force detected by the steering assist force detector and determining based on a result of the comparison whether or not the power steering system is abnormal.

12. A power steering system according to claim 11, wherein the steering assist force detector comprises a torque sensor for detecting a steering torque produced between the steering wheel and the steering mechanism.

13. A power steering system according to claim 11, wherein the driving state detector is configured to detect a rotation speed of the electric motor.

14. A power steering system according to claim 13, wherein the driving state detector is configured to estimate the rotation speed of the electric motor based on a current value and a voltage value of electricity supplied to the electric motor.

15. A power steering system according to claim 11, wherein the steering assist force detector comprises a torque sensor for detecting a steering torque produced between the steering wheel and the steering mechanism, the driving state detector is configured to detect a rotation speed of the electric motor, and the abnormal condition monitoring circuit is configured to determine that the power steering system is abnormal when the steering torque of the steering wheel is equal to or larger than a predetermined value and the rotation speed of the electric motor is equal to or smaller than a predetermined value.

16. A power steering system according to claim 15, wherein the electric motor control circuit is configured to stop supply of electricity to the electric motor when the abnormal condition monitoring circuit determines that the power steering system is abnormal.

17. A power steering system according to claim 11, wherein the steering assist force detector comprises a torque sensor for detecting a steering torque produced between the steering wheel and the steering mechanism, the driving state detector is configured to detect a rotation speed of the electric motor, and the abnormal condition monitoring circuit is configured to determine that the power steering system is abnormal when the steering torque of the steering wheel is equal to or larger than a predetermined value and the rotation speed of the electric motor is equal to or larger than a predetermined value.

18. A power steering system according to claim 16, wherein the electric motor control circuit is configured to stop supply of electricity to the electric motor when the abnormal condition monitoring circuit determines that the power steering system is abnormal.

19. A power steering system according to claim 11, further comprising a communication passage for providing communication between the first and second passages and a valve disposed in the communication passage, wherein when the abnormal condition monitoring circuit determines that the power steering system is abnormal, the valve is opened to provide communication between the first and second passages.

20. A power steering system according to claim 11, wherein the abnormal condition monitoring circuit is configured to determine that the power steering system is normal when the steering assist force is smaller than a predetermined value.

* * * * *